US008253534B2

(12) United States Patent
Nakazawa et al.

(10) Patent No.: US 8,253,534 B2
(45) Date of Patent: Aug. 28, 2012

(54) VEHICLE DOOR CONTROL SYSTEM AND METHOD

(75) Inventors: Atsushi Nakazawa, Anjo (JP); Kazuya Takasaki, Chiryu (JP)

(73) Assignee: Denso Corporation, Kariya (JP)

( * ) Notice: Subject to any disclaimer, the term of this patent is extended or adjusted under 35 U.S.C. 154(b) by 524 days.

(21) Appl. No.: 12/397,731

(22) Filed: Mar. 4, 2009

(65) Prior Publication Data

US 2009/0224879 A1 Sep. 10, 2009

(30) Foreign Application Priority Data

Mar. 6, 2008 (JP) .................................. 2008-56832

(51) Int. Cl.
*G08B 29/00* (2006.01)
*B60R 25/10* (2006.01)

(52) U.S. Cl. ............. 340/5.72; 340/426.16; 340/426.17; 340/426.28; 340/426.36

(58) Field of Classification Search ............. 340/426.13, 340/426.28, 426.36, 539.1, 539.11, 5.72, 340/426.14, 426.16, 426.17, 430, 5.61, 5.62, 340/5.63
See application file for complete search history.

(56) References Cited

U.S. PATENT DOCUMENTS 5,113,182 A * 5/1992 Suman et al. ................ 340/5.28
5,710,548 A 1/1998 LeMense
6,208,239 B1 * 3/2001 Muller et al. ............ 340/426.35
2004/0124968 A1 7/2004 Inada et al.
2004/0140883 A1 * 7/2004 Jalil et al. ...................... 340/5.64
2006/0214769 A1 * 9/2006 Nakashima et al. ......... 340/5.72
2006/0244312 A1 11/2006 Ogino et al.
2006/0290466 A1 * 12/2006 Kamiya ......................... 340/5.6
2007/0024416 A1 * 2/2007 Tang et al. ................... 340/5.61
2007/0115096 A1 5/2007 Suzuki et al.
2007/0132553 A1 * 6/2007 Nakashima .................. 340/5.72
2007/0191998 A1 * 8/2007 Arie et al. ......................... 701/2
2010/0283581 A1 * 11/2010 Heigl ........................... 340/5.72

FOREIGN PATENT DOCUMENTS

JP 6-288133 10/1994
JP 07-044189 2/1995
JP 2001-271527 10/2001
JP 2004-190233 7/2004
JP 2005-133529 5/2005
JP 2006-336343 12/2006
JP 2007-023620 2/2007
JP 2007-277867 10/2007

OTHER PUBLICATIONS

Japanese Office Action dated Dec. 22, 2009, issued in corresponding Japanese Application No. 2008-056832, with English translation.

* cited by examiner

*Primary Examiner* — Daniel Wu
*Assistant Examiner* — John Bamert
(74) *Attorney, Agent, or Firm* — Nixon & Vanderhye P.C.

(57) ABSTRACT

In a vehicle door control system, a portable unit stores registration of an instruction of automatic door-opening to a vehicle unit, when predetermined registration processing is made on the portable unit. In response to a request signal from the vehicle unit, the portable unit transmits a response signal including an ID code and the instruction of the registered automatic door-opening operation. The vehicle unit unlocks a vehicle door without any manual door-unlocking operation by a user and automatically opens the vehicle door, when the response signal includes the instruction and the ID code matches a predetermined ID code.

10 Claims, 4 Drawing Sheets

VEHICLE DOOR CONTROL SYSTEM AND METHOD

CROSS REFERENCE TO RELATED APPLICATION

This application is based on and incorporates herein by reference Japanese Patent Application No. 2008-56832 filed on Mar. 6, 2008.

FIELD OF THE INVENTION

The present invention relates to a vehicle door control system and method, which control vehicle doors by bilateral communications between a portable unit and a vehicle unit.

BACKGROUND OF THE INVENTION

A conventional vehicle door control system controls locking and unlocking of each door of a vehicle by way of bilateral communications between a portable unit (e.g., portable electronic key) and a vehicle unit and checking ID codes. In this system, transmitters of the vehicle unit periodically transmit request signals to define predetermined range of communications areas around the vehicle respectively. Thus, the system monitors approaching and leaving of a holder (e.g., vehicle driver) carrying the portable unit to and from the vehicle.

For example, when the holder approaches the vehicle and enters into the communications area to get in the vehicle, the portable unit transmits a response signal including its ID code in response to the received request signal. The vehicle unit receives the response signal and check whether the ID code included in the response signal matches a registered ID code stored in the vehicle unit, that is, whether the two ID codes are in a predetermined correspondence relation. If both IDs match, the vehicle unit generates a control signal to each door control device in the vehicle to drive the vehicle door to an unlock standby condition. When the holder touches a door handle under this standby condition, the vehicle door control device responsively opens the vehicle door.

In another conventional vehicle door control system, for example, US 2006/0214769 A1 (JP 2006-266023A), an automatic open/close door is automatically opened in response to the unlocking of the vehicle door. This automatic door-opening operation further enhances convenience for the holder having the portable unit.

However, the unlocking operation and the automatic door-opening operations are effected only when the holder performs a certain manipulation (unlock operation) on a door handle. Such a manipulation includes, for example, touching a door handle or manipulating a switch provided on the door handle. The door handle manipulation is required for the vehicle door unlocking and the automatic door opening to inhibit the vehicle door from being unlocked or automatically opened erroneously and unintendedly whenever the holder approaches close to the vehicle.

However, when the holder carries luggage such as boxes, packages or articles by both hands, it is difficult for him/her to perform the required unlock manipulation on the door handle. In this instance, the holder is obliged to place the luggage on the ground once and then takes up the same again after completing the required unlock manipulation on the door handle.

SUMMARY OF THE INVENTION

It is therefore an object of the present invention to provide a vehicle door control system and method, which simplify required manipulation work for automatic vehicle door control.

According to one aspect, a vehicle door control system comprises a portable unit and a vehicle unit, which perform bilateral radio communications therebetween. The portable unit is configured to receive a request signal from the vehicle unit and transmit a response signal including an ID code thereof in response to the received request signal. The portable unit has a registration memory section that stores an instruction of an automatic door-opening operation when predetermined registration processing is made, and is configured to transmit an instruction signal for instructing the automatic door-opening operation to the vehicle unit, if the instruction of an automatic door-opening operation is stored. The vehicle unit is configured to acquire the ID code included in the response signal, compare the acquired ID code with a registered ID code, and control a vehicle door when the ID codes match. The vehicle unit has a lock condition control section that controls a lock/unlock condition of the vehicle door, and an automatic door-opening section that automatically performs a door-opening operation. The vehicle unit is configured to drive the lock condition control section and the automatic door-opening section to unlock the vehicle door and automatically open the vehicle door, respectively, when the instruction signal is received from the portable unit and the ID codes match under a condition that the vehicle is kept parked with the vehicle door being locked.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
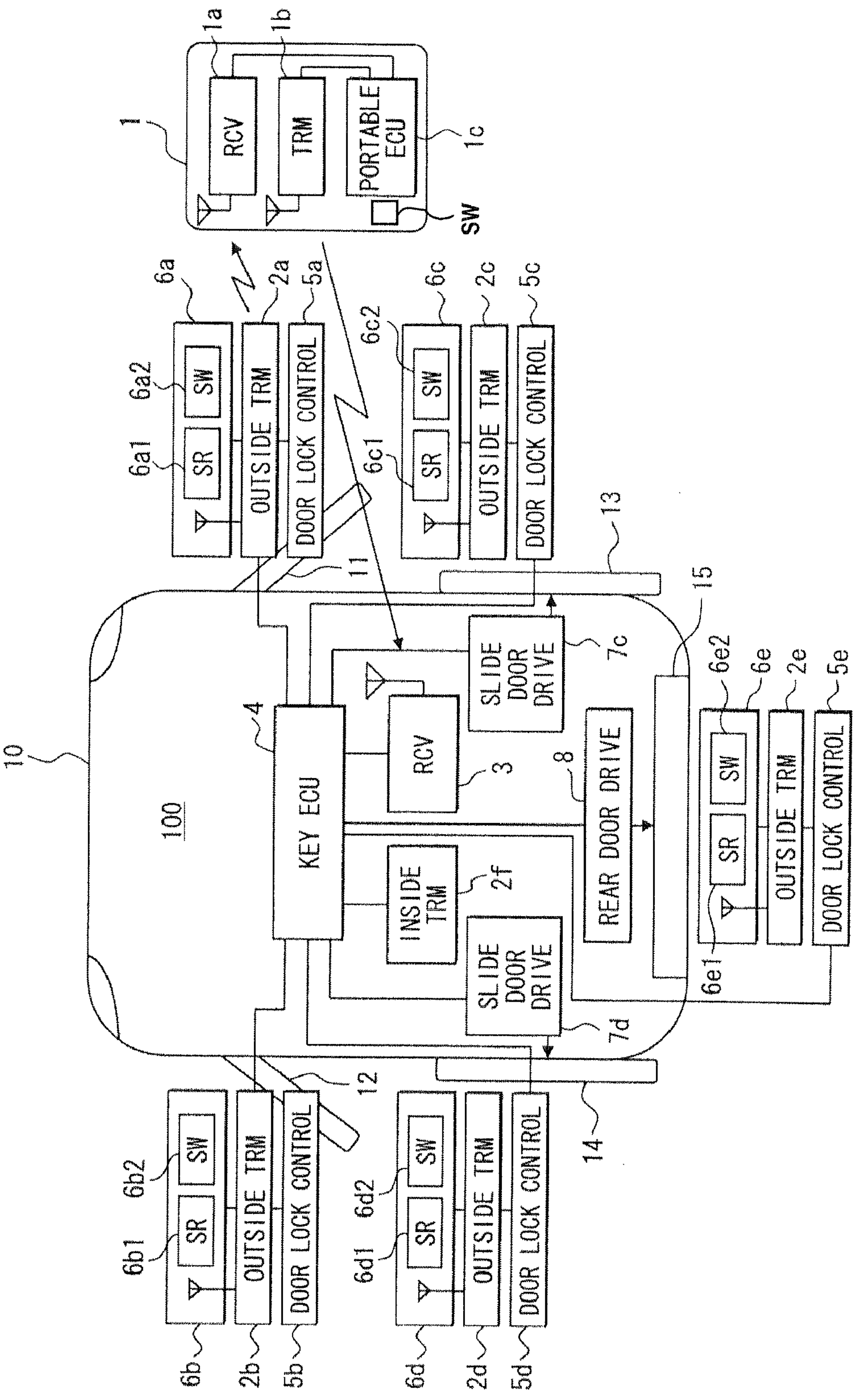
FIG. 1 is a block diagram showing a vehicle door control system according to an embodiment of the present invention.

Referring first to FIG. 1, a vehicle door control system is configured by a portable unit (e.g., electronic key) 1 carried by a holder (e.g., vehicle driver or user) and a vehicle unit 100 mounted on a vehicle 10. The portable unit 1 and the vehicle unit 100 are configured to perform bilateral radio communications each other. The vehicle unit 100 includes an electronic key ECU (electronic control unit) 4, which is configured to check ID codes of the portable unit 1 and the vehicle unit 100. The key ECU 4 is further configured to control locking and unlocking of vehicle doors 11 to 15 based on a check result of ID codes.

The portable unit 1 includes a receiver 1*a* and a transmitter 1*b*. The receiver 1*a* is for receiving request signals transmitted from the vehicle unit 100 and the transmitter 1*b* is for transmitting a response signal including the ID code of the portable unit 1. The portable unit 1 further includes a portable unit ECU 1*c* connected to the receiver 1*a* and the transmitter 1*b* to execute various programmed control processing. Specifically, the portable ECU 1*c* checks whether the request signal has been received based on a reception signal of the receiver 1*a*, generates the response signal in response to the request signal, and drives the transmitter 1*b* to transmit the response signal.

The portable ECU 1*c* further checks whether predetermined registration processing, for example, processing of registering instruction of automatic door-opening operation, has been performed by the holder by manipulating a switch (SW) of the portable unit 1. If the registration processing has been performed, the response signal is generated to include a door-opening instruction signal. This instruction signal instructs an automatic door-opening operation to be performed by the vehicle unit 100. The switch for registration processing may be an exclusive one or an existing switch or switches. The registration processing may be performed by manipulating the existing switch for a predetermined time or by manipulating a plurality of the existing switches in combination.

The vehicle unit 100 includes outside transmitters 2*a* to 2*e* provided on the respective vehicle doors 11 to 15 and an inside transmitter 2*f* provided in a passenger compartment of the vehicle 10. These transmitters 2*a* to 2*f* are configured to transmit request signals in the outward direction and in the vehicle compartment, respectively, in response to transmission instruction signals generated by the key ECU 4.

The vehicle doors 11 and 12 for front seats are hinged doors, and the vehicle doors 13 and 14 for rear seats are slide doors. Slide door drive actuators 7*c* and 7*d* including electric motors as actuating power sources are provided for the vehicle doors 13 and 14 to automatically open and close the doorways to the passenger compartment by sliding (opening and closing) the slide doors in response to door opening and closing instruction signals from the key ECU 4.

The door 15 is provided at the rear end of the vehicle 10 and is a swing or flip door. A rear door drive actuator 8 including an electric motor as an actuating power source is provided for the rear door 15 to automatically open and close a doorway to a luggage compartment in response to a door opening and closing instruction signal from the key ECU 4. This automatic opening and closing of these doors 13 to 15 helps passengers to get in or off the vehicle 10, because these doors 13 to 15 are comparatively heavy. If the luggage compartment is separated from the passenger compartment as in a passenger vehicle, the rear door 15 may be a trunk lid.

The request signal from each outside transmitter 2*a* to 2*e* is set to reach about 0.7 to 1.0 m. When the vehicle 10 is parked, a detection area of about 0.7 to 1.0 m is formed around each door 11 to 15, so that the vehicle unit 100 may detect that the holder carrying the portable unit 1 has approached close to any one of the vehicle doors 11 to 15 of the vehicle 10. The request signal from the inside transmitter 2*f* is set to reach anywhere in the vehicle compartment thereby to detect whether the portable unit 1 is within the vehicle compartment.

The vehicle unit 100 includes a receiver 3, which is configured to be able to receive the response signal of the portable unit 1 immediately after generation of the transmission instruction signal to the transmitters 2*a* to 2*f*. The key ECU 4 is configured to receive the response signal which the receiver 3 receives. The key ECU 4 is configured to check the received response signal as to whether the ID code is included, and determine whether to control locking and unlocking of the vehicle doors 11 to 15 in accordance with the ID code check result. The key ECU 4 is further configured to check the received response signal as to whether the automatic door opening instruction signal is included, thereby determining whether to control the automatic door opening should be performed for the vehicle doors 13, 14 and 15.

The vehicle unit 100 further includes door lock control units 5*a* to 5*e* provided in the respective doors 11 to 15 to lock and unlock the vehicle doors 11 to 15, and to set the vehicle doors 11 to 15 into an unlock standby condition. Under the unlock standby condition, the vehicle doors 11 to 15 are still in the locked condition. However, the vehicle doors 11 to 15 are in the condition to be unlocked when the holder carrying the portable unit 1 touches any one of outside handles (not shown) of the vehicle doors 11 to 15. The unlock control units 5*a* to 5*e* perform respective locking and unlocking operations in response to the instruction signal from the key ECU 4.

On the door handles 6*a* to 6*e* of the vehicle doors 11 to 15, touch sensors 6*a*1 to 6*e*1 are provided, respectively, to detect manipulation of any one of the door handles 6*a* to 6*e* by the holder. The door handles 6*a* to 6*e* are also provided with door lock switches 6*a*2 to 6*e*2, which may be formed as push switches. When any one of the vehicle door lock switches 6*a*2 to 6*e*2 is manipulated, the vehicle doors 11 to 15 are locked. The door handles 6*a* to 6*e* are made of metal and configured to operate also as respective antennas of the outside transmitters 2*a* to 2*e*.

The bilateral communications between the portable unit 1 and the vehicle unit 100 and the vehicle door control (locking/unlocking and automatic opening/closing of door) by the vehicle unit 100 will be described in detail with reference to FIGS. 2 to 4. The portable ECU 1*c* of the portable unit 1 is programmed to execute the processing shown in FIG. 2.

Figure 2:
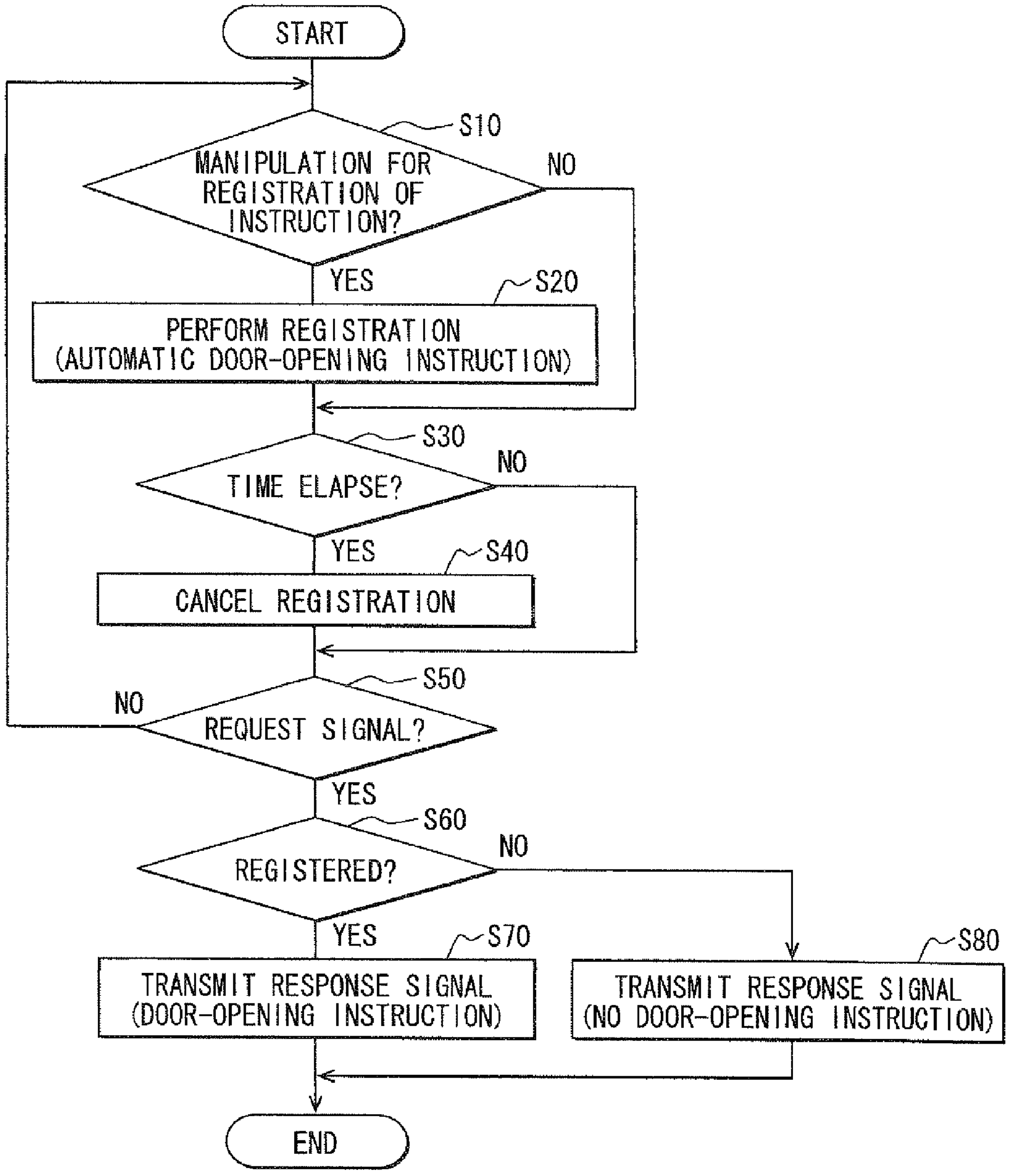
FIG. 2 is a flow diagram showing control processing executed by a portable unit shown in FIG. 1.

As shown in FIG. 2, it is checked at S10 whether a manipulation of processing for registering a predetermined instruction, which is an instruction of automatic opening of a vehicle door to the vehicle unit 100, has been performed on the switch of the portable unit 1. If the switch manipulation has been made for registration, registration of such an instruction is made at S20 by storing this instruction in a memory of the portable ECU 1*c*.

For example, the registration processing may be made in the portable unit 1 in advance, if there are many luggage to be loaded into the vehicle 10 and the holder will not be able to use his/her hands to open doors. By performing the registration processing, when the holder approaches the vehicle 10, the vehicle doors 13 to 15 can be automatically opened after unlocking all vehicle doors 11 to 15.

At S30, it is checked whether a predetermined time has elapsed after the registration processing of S20. If the predetermined time has elapsed, the automatic door-opening instruction registered in the memory of the portable ECU 1*c* is canceled at S40.

The door unlocking and automatic door-opening operation will normally be delayed in time relative to the registration processing. If the delay time becomes excessive, it is very likely that the holder does not remember that the registration processing has been made before. In such a case, the vehicle door will be unlocked and automatically opened against the intent of the holder, that is, even when the holder does not want the door unlocking and automatic opening. Therefore, the registration processing is canceled by erasing the stored instruction, if the predetermined time has elapsed without bilateral communications with the vehicle unit 100.

It is checked at S50 whether the receiver 1*a* has received any of the request signals transmitted form the transmitters 2*a* to 2*e* of the vehicle unit 100. If no request signal has been received, the processing returns to S10. If any of the request signals has been received, S60 is executed.

The receiver 1*a*, the transmitter 1*b* and the portable ECU 1*c* of the portable unit 1 are normally operated with electric power of a built-in battery (not shown). Therefore, it will be preferred to periodically perform only reception of input of manipulation for the registration processing and reception of the request signal and perform other processing in a sleep mode. That is, only when the manipulation for the registration processing is made or the request signal is received, the portable unit 1 may be switched to the normal mode from the sleep mode.

If the request signal has been received, it is checked at S60 whether the instruction of automatic door-opening operation is kept stored. If it is kept stored, the transmitter 1*b* is driven to transmit a response signal at S70. This response signal includes both the ID code of the portable unit 1 and the automatic door-opening instruction stored in the memory. If it is not kept stored, the transmitter 1*b* is driven to transmit a response signal at 580. This response signal includes the ID code but not the automatic door-opening instruction.

Figure 3:
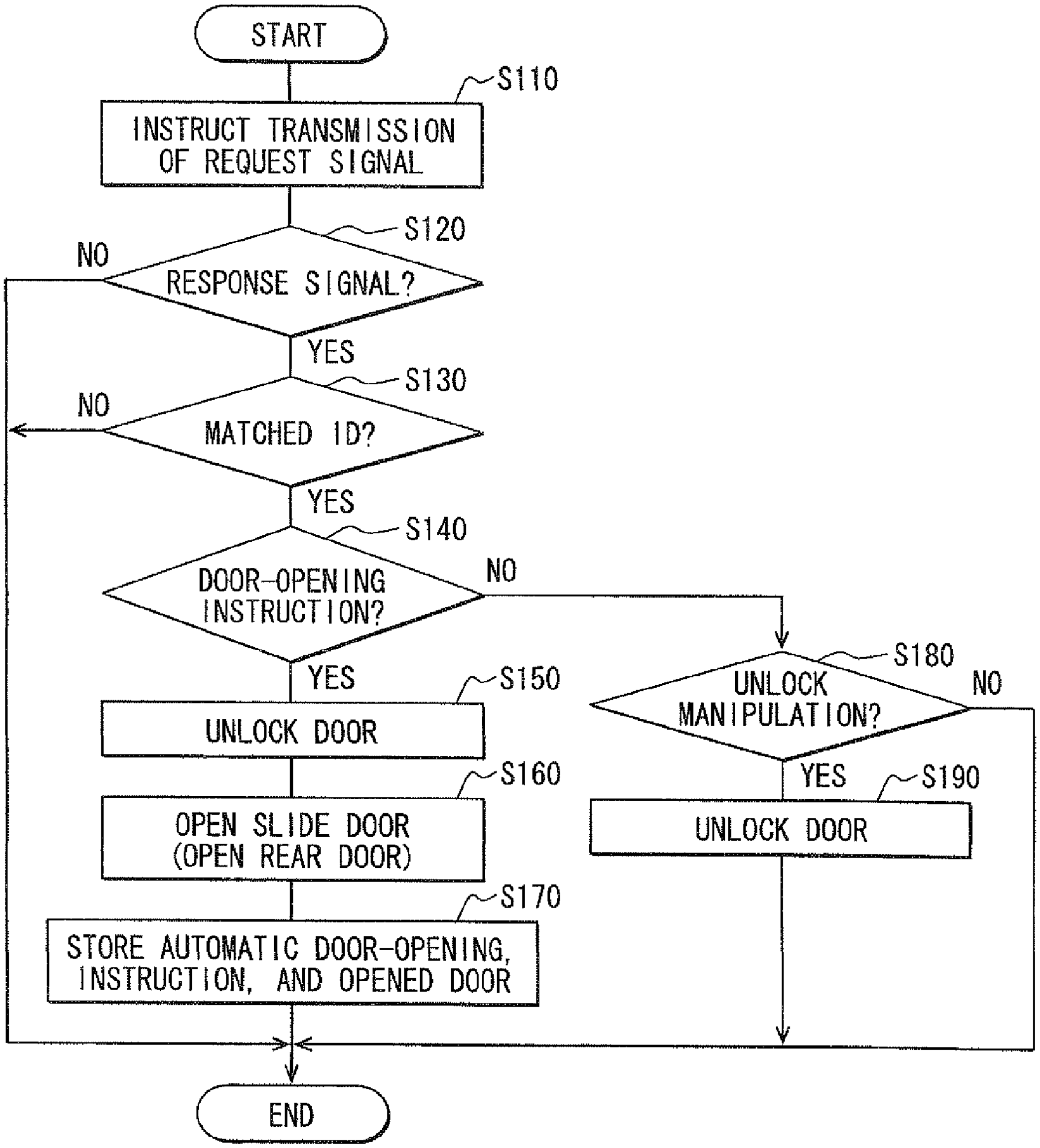
FIG. 3 is a flow diagram showing control processing executed by a vehicle unit shown in FIG. 1 when a holder carrying a portable unit gets in a vehicle.
Figure 4:
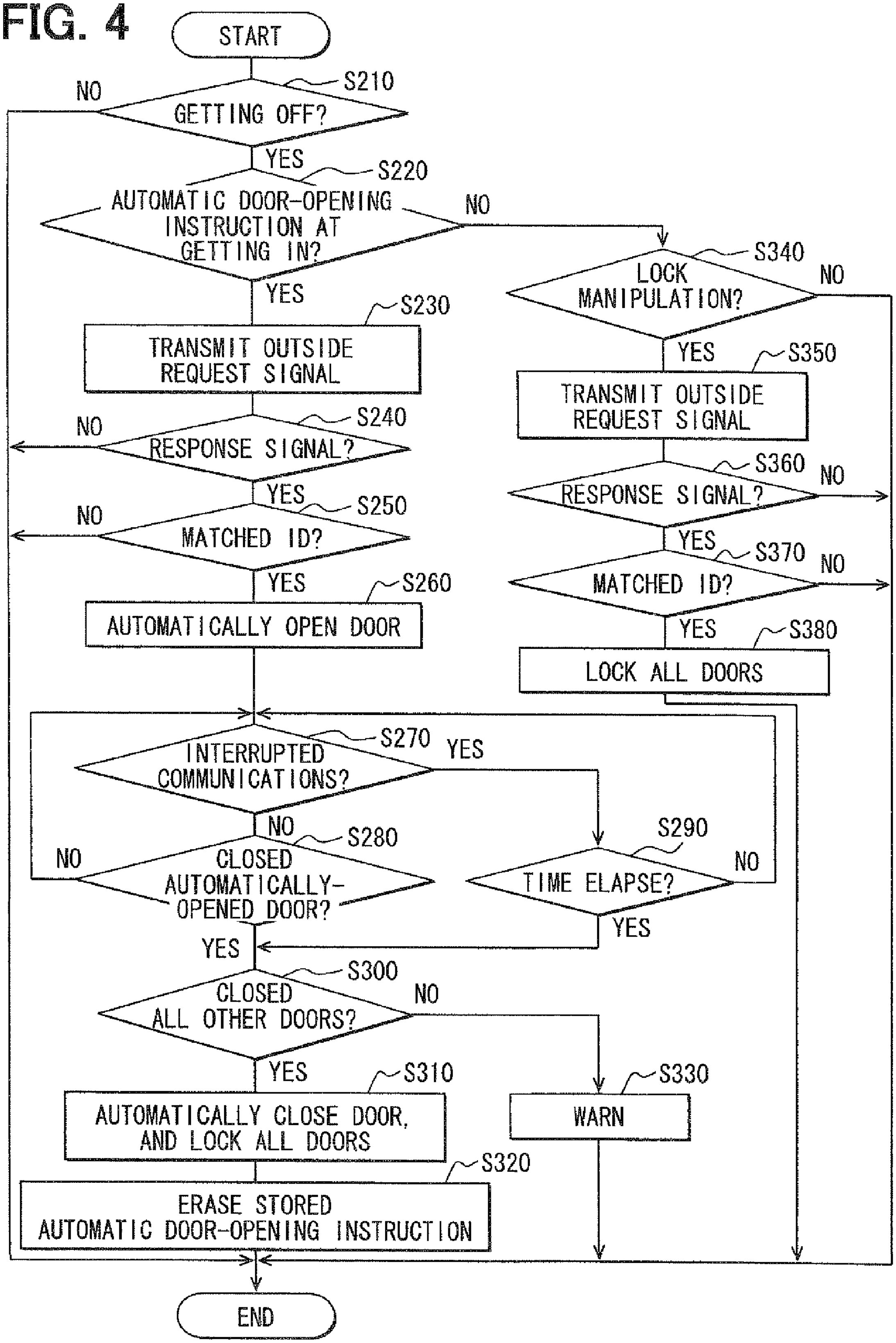
FIG. 4 is a flow diagram showing control processing executed by the vehicle unit when the holder gets off the vehicle.

When the holder carrying the portable unit 1 approaches and gets in the vehicle, the vehicle unit 100, particularly the key ECU 4, executes control processing shown in FIGS. 3 and 4. The processing of FIG. 3 is executed periodically, for example at every several seconds, while the vehicle 10 is parked with its engine being not operated and with all the vehicle doors 11 to 15 being kept locked.

At S110, the outside transmitters 2*a* to 2*e* are driven periodically to transmit respective request signals to check whether holder (portable unit 1) is near the vehicle 10. It is checked at S120 whether a response signal has been received from the portable unit 1 in response to the transmitted request signal. If no response signal has been received, it is determined that the holder is not within the detection area around the vehicle 10 and the processing is terminated, If the response signal has been received, the processing proceeds to S130.

It is noted that the request signals of the transmitters 2*a* to 2*e* include respective identification codes (door specifying data) and the response signal of the portable unit 1 includes the identification code of the received request signal. Alternatively, the transmitters 2*a* to 2*e* may be driven to transmit respective request signals at different time points in a predetermined transmission order. Thus, the key ECU 4 can determine to which one of the request signals of the transmitters 2*a* to 2*e* the portable unit 1 has responded, that is, to which door the holder is approaching.

At S130, it is checked whether the ID code included in the received response signal is in the predetermined relation with the ID code stored in the key ECU 4, for example, whether the both IDs are identical and match each other. If the ID codes do not match, the processing is terminated. If the ID codes match, S140 is executed.

At S140, it is further checked whether the received response signal includes the automatic door-opening instruction signal. If it is included, S150 is executed. If it is not included, S180 is executed.

At S180, it is checked whether the holder has performed a predetermined unlock manipulation such as touching any of the door handles 6*a* to 6*e* in the same manner as in the conventional door control system. It is noted that the specific one of the vehicle doors 11 to 15 is specified based on the identification code included in the response signal or the time point of reception of the response signal. As a result, one of the vehicle door lock control units 5*a* to 5*e* corresponding to the specified door is driven to set the corresponding door into the unlock standby condition. Specifically, one of the touch sensors 6*a*1 to 6*e*1 of the door handles 6*a* to 6*e* is made active to detect whether the holder has touched the door handle 6*a* to 6*e*.

If it is detected by any one of the touch sensors 6*a*1 to 6*e*1 that the holder has touched the corresponding one of the door handles 6*a* to 6*e*, such a detection signal is transmitted to the key ECU 4. Thus, the vehicle door unlock manipulation by the holder is determined at S180, and S190 is executed. If no such manipulation is determined at S180, the processing is terminated.

At S190, all the vehicle door lock control units 5*a* to 5*e* are instructed to unlock the corresponding doors 11 to 15.

It is also possible to detect the unlock manipulation of the holder on the vehicle doors 11 to 15 by using mechanical detection devices that detect the holder manipulation on any of the door handles 6*a* to 6*e*, in place of the touch sensors 6*a*1 to 6*e*1. It is further possible to detect the unlock manipulation by using unlock buttons, which may be provided in the door handles 6*a* to 6*e*. It is still further possible to provide only the touch sensors 6*a*1 to 6*e*1 or the vehicle door lock switches 6*a*2 to 6*e*2 on the vehicle doors 11 to 15 by providing a common manipulation part in each door for both locking and unlocking. All the vehicle doors 11 to 15 may be set to the unlock standby condition, if the ID codes match.

If it is determined at S140 that the received response signal includes the automatic door-opening instruction, all the vehicle doors 11 to 15 are unlocked at S150 whether the holder has made the unlock manipulation operation or not. At S160, one of the slide doors 13, 14 and the rear door 15, which is closest to the holder, is automatically opened by instructing the corresponding one of the vehicle door drive units 7*c*, 7*d* and 8. Finally, at S170, the key ECU 4 stores generation of the automatic door-opening instruction and the vehicle door, which is automatically opened.

As described above, the portable unit 1 registers therein the instruction of the automatic door-opening operation of the vehicle unit 100 when the registration processing is manipulated. The portable unit 1 transmits the response signal including the automatic door-opening instruction signal, if the automatic door-opening instruction is stored.

The vehicle unit 100 unlocks the vehicle doors 11 to 15 and automatically opens the vehicle door 13, 14 or 15, if the ID codes match and the response signal includes the automatic door-opening instruction. As a result, even when the holder is full of luggage or any other like stuff and not able to use hands to open a door, the vehicle door can be unlocked and automatically opened when approaching the vehicle door. Thus, the holder can easily load the luggage in the compartment through the automatically opened door without special work.

This automatic door-opening operation is however limited to only a case, in which the predetermined registration processing has been manipulated on the portable unit 1. Thus it will be prevented that the vehicle door is opened automatically against the intention of the holder, if no registration is made on the part of the portable unit 1.

Since the predetermined registration processing is made by manipulating the switch of the portable unit 1 by the holder himself/herself, the vehicle door unlock and automatic door-opening operation can be limited to only the case, in which the holder actually intended such an automatic operation.

It is however possible to implement the predetermined registration processing by the reception of data of the portable unit 1 from a data transmitter external to the portable unit 1. For example, when the holder shops at a certain store, the holder may make the registration processing by manipulating a transmitter provided at the store at the time of payment so that the registration processing may be automatically made in the portable unit 1 of the holder when the holder approaches the vehicle with the shopped articles. It is preferred that the registration processing is notified by voice or display when it is implemented by such an external data transmitter, so that the holder may recognize the registration processing.

In the above embodiment, when the ID codes match and the automatic door-opening instruction has been received, the vehicle unit 100 unlocks all the vehicle doors 11 to 15 and automatically opens the specified vehicle door to which the holder has approached most closely. This unlocking and automatic door-opening operation is for helping the holder to load the luggage into the rear or luggage compartment of the vehicle 10. However, the vehicle door unlocking may be effected only at the vehicle door to which the holder has most approached. The automatic door-opening may be effected at the other doors which are not closest to the holder.

In the above embodiment, the slide doors 13, 14 and the rear door 15 are automatic type, and they may be automatically closed as well when detecting that the holder has entered into the passenger compartment.

Entering of the holder into the passenger compartment may be detected when the bilateral communications of the outside transmitters 2*a* to 2*e* with the portable unit 1 has been interrupted and instead the bilateral communications of the inside transmitter 2*f* with the portable unit 1 has started. Further, it may be detected by seat sensors, which detect seating of the holder on any of the seats in the passenger compartment. It may be detected when a door, which is other than the automatically-opened door and adjacent to seats, has been opened and closed in sequence by the holder. It is possible to confirm that the holder has opened and closed the vehicle door in sequence, based on the position of the outside transmitters 2*a* to 2*e* to which the portable unit 1 has communicated bilaterally and the signals of door open/close switches. The entering of the holder into the compartment may also be detected by any combination of these detection methods.

When the holder carrying the portable unit 1 gets off the vehicle 10, the key ECU 100 executes the processing of FIG. 4.

At S210, it is checked whether the holder has got off the vehicle 10 based on that an engine switch of the vehicle 10 has been turned off and the vehicle doors 11 to 14 have been opened and closed. If the holder has got off the vehicle 10, it is checked at S220 whether the automatic door-opening instruction has been generated at the time of getting on the vehicle 10. Whether the automatic door-opening instruction has been generated may be checked at S220 by checking whether the automatic door-opening instruction having been stored at S170 (FIG. 3) is kept stored in the key ECU 4.

If no automatic door-opening instruction has been generated, all the vehicle doors 11 to 15 are locked in response to the vehicle door lock manipulation of the holder in the same manner as in the conventional vehicle door control system.

Specifically, it is checked at S340 whether any of the lock switches 6*a*2 to 6*e*2 provided in the door handles 6*a* to 6*e* has been manipulated by the holder. If the vehicle door lock switch 6*a*2 to 6*e*2 has been manipulated, the outside transmitters 2*a* to 2*e* are driven to transmit request signals at 5350. It is checked at S360 whether a response signal has been received in response to the request signal. These steps are for checking whether the manipulation on the vehicle door lock switch has been made by the holder. At S370, it is checked whether the ID code included in the received response signal matches the ID code stored in the key ECU 4. If all the above check results are YES indicating that the holder has got off the vehicle 10 and manipulated the vehicle door lock switch, all the vehicle doors 11 to 15 are locked at S380.

It is preferred in this case to transmit a request signal from an inside transmitter 2*f* into the vehicle compartment to confirm that no response signal is received in response to this request signal. Thus it is surely prevented that the vehicle doors 11 to 15 are locked inadvertently with the portable unit 1 being left in the vehicle compartment.

If the automatic door-locking instruction has been generated at the time of getting in, S230 is executed to start transmission of the request signals from the outside transmitters 2*a* to 2*e* irrespective of the vehicle door lock operation by the holder. If it is determined at S240 and S250 that the response signal has been received in response to the request signals and the ID code of the response signal matches the stored ID code, the vehicle door that has been automatically opened at the time of getting in is automatically opened again at S260.

In some cases, the holder gets in the driver's seat or the front passenger's seat in the vehicle 10 after automatically opening the rear door 15 or the slide door 13, 14 and loading the luggage into the vehicle 10. In this case, it is highly possible that the holder opens such a door that has been automatically opened again to take out the luggage, when the holder gets off the vehicle 10.

For this reason, when the holder gets off the vehicle, the bilateral communications is made between the outside transmitters 2*a* to 2*e* and the portable unit 1. If the ID codes match, the vehicle doors that are kept stored as having been automatically opened at the time of getting in are automatically opened again. Thus, the luggage can be easily unloaded from the vehicle 10.

It is also possible to automatically open the vehicle door that is kept stored as having been opened, on condition that the ID code matching has been confirmed by way of the bilateral communications performed by the outside transmitter corresponding to the stored door. In this instance, the vehicle door is automatically opened when it is confirmed that the holder is near the stored door. Therefore, the vehicle door can be automatically opened at the time point when it becomes highly possible that the holder will unload the luggage.

If the rear door 15 is automatically opened at the time of getting in, the holder will surely get in the vehicle through a vehicle door other than the rear door 15. If the slide door 13, 14 is automatically opened, it is possible that the holder gets in the vehicle 10 through such a slide door 13, 14 after loading the luggage.

For this reason, it is possible to store at S170 (FIG. 3) both the automatically opened door and the used door, which the holder has used to get in the vehicle 10, and to check at S220 (FIG. 4) whether the automatically-opened door and the used door are different in addition to whether the automatic door-opening instruction was generated at the time of getting in the vehicle 10. Alternatively, it is also possible to store only the automatic door-opening instruction and the automatically-opened door at S170 (FIG. 3), if the automatically-opened door and the used door are different.

At S270, it is checked whether the bilateral communications between the portable unit 1 and the outside transmitters 2*a* to 2*e* has been interrupted. If the bilateral communications has not been interrupted yet because the holder is still near the vehicle 10, S280 is executed. If the bilateral communications has been interrupted because the holder is not near the vehicle 10 anymore, S290 is executed.

It is checked at S280 whether the holder has made the manipulation for closing the vehicle door, which has been automatically opened, and the vehicle door has been closed. This check is made because the holder is still near the vehicle doors 11 to 15. If the vehicle door has not yet been closed, S270 is repeated. If the vehicle door has been closed, S300 is executed.

At S290, which is executed if the bilateral communications is interrupted, it is checked whether a predetermined time elapsed after the bilateral communications has been interrupted. If the predetermined time has not yet elapsed, S270 is repeated. If the predetermined time has elapsed, S300 is executed.

It is checked at S300 whether all the vehicle doors other than the automatically-opened door has been closed. If all the checked doors has been closed, S310 is executed. If the automatically-opened door is still open and has not yet been closed, such a door is automatically closed and all the vehicle doors 11 to 15 are locked. Then, at S320, the data stored in the memory regarding the automatic door-opening instruction is erased. If any of the vehicle doors other than the automatically-opened door is open, such a door cannot be locked. Therefore, a warning is issued at S330 by, for example, blowing a buzzer.

As described above, the vehicle unit 100 operates to automatically close the automatically-opened door and lock all the vehicle doors 11 to 15, when the bilateral communications with the portable unit 1 is interrupted. Thus, the holder need not work to close and lock the vehicle doors after unloading the luggage from the vehicle 10. The automatic door-closing and locking of all the vehicle doors 11 to 15 are automatically performed when the holder leaves the communications areas of the bilateral communications of the vehicle 10. Thus, the unloading and handling of the luggage by the holder can be attained easily.

In the above embodiment, the automatic door closing and the door locking are performed not immediately but after the predetermined time from the interruption of the bilateral communications between the portable unit 1 and the vehicle unit 100. As a result, even when the holder cannot unload all the luggage at one time and need to leave the vehicle 10 with the unloaded luggage for a moment, the vehicle door is maintained in the automatically-opened state. Thus, the holder can unload the remaining luggage smoothly. This predetermined time (S290) may be set arbitrarily.

What is claimed is:

1. A vehicle door control system comprising:

a portable unit configured to receive a request signal and transmit a response signal including an ID code thereof in response to the received request signal by way of bilateral communications;

a vehicle unit configured to acquire the ID code included in the response signal, compare the acquired ID code with a registered ID code, and control a vehicle door when the ID codes match;

the portable unit having a registration memory section that stores an instruction of an automatic door-opening operation when predetermined registration processing is made, and being configured to transmit an instruction signal for instructing the automatic door-opening operation to the vehicle unit by way of the bilateral communications if the instruction of an automatic door-opening operation is stored;

the vehicle unit having a lock condition control section that controls a lock/unlock condition of the vehicle door, and an automatic door-opening section that automatically performs a door-opening operation;

the vehicle unit being configured to drive the lock condition control section and the automatic door-opening section to unlock the vehicle door and automatically open the vehicle door, respectively, when the instruction signal is received from the portable unit and the ID codes match under a condition that the vehicle is kept parked with the vehicle door being locked;

the portable unit further having a switch that is manipulated to perform the predetermined registration processing; and the portable unit being configured to invalidate registration of the instruction of an automatic door-opening operation if a predetermined time from the instruction being stored in the registration memory section elapses without the portable unit performing the bilateral communications during the predetermined time.

2. The vehicle door control system according to claim 1, wherein:

the vehicle unit has a plurality of automatic door-opening sections that automatically open a plurality of vehicle doors, respectively, and a specifying section that specifies one of the plurality of vehicle doors, which is closest to the portable unit; and the vehicle unit is configured to drive the lock condition control section to unlock the vehicle doors and automatically open the specified one of a plurality of vehicle doors, when the instruction signal is received from the portable unit and the ID codes match.

3. The vehicle door control system according to claim 2, wherein:

the vehicle unit includes a plurality of transmitters provided at different locations to perform the bilateral communications with the portable unit; and the specifying section is configured to specify the door, which is closest to the portable unit, based on a location of the transmitter that successfully performed the bilateral communications with the portable unit.

4. The vehicle door control system according to claim 2, wherein:

the automatic door-opening section is configured to be capable of automatically closing the door; and the vehicle unit has a detecting section that detects entering of the portable unit into the vehicle, and is configured to automatically close the door, which has been automatically opened by the automatic door-opening section, when the detecting section detects the entering of the portable unit into the vehicle.

5. The vehicle door control system according to claim 4, wherein:

the detecting section is configured to detect the entering of the portable unit into the vehicle based on opening and closing of a vehicle door, which is for access to a passenger seat in the vehicle and other than the vehicle door automatically opened by the automatic door-opening section, is opened and closed by a holder of the portable unit.

6. The vehicle door control system according to claim 2, wherein:

the vehicle unit has a detecting section that detects entering of the portable unit into the vehicle, and a memory section that stores a vehicle door that has been automatically opened by the automatic door-opening section when the detecting section detects the entering of the portable unit into the vehicle through a vehicle door, which is for access to a passenger seat in the vehicle and other than the vehicle door automatically opened by the automatic door-opening section; and the vehicle unit is configured to automatically open the vehicle door stored in the memory section, when the portable unit is taken out from the vehicle and the ID codes are confirmed to match each other by way of the bilateral communications with the portable unit.

7. The vehicle door control system according to claim 6, wherein:

the automatic door-opening section is configured to automatically close the vehicle door; and the vehicle unit drives the automatic door-opening section and the lock condition control section to automatically close the vehicle door automatically opened by the automatic door-opening section and lock the vehicle door, respectively, when the bilateral communications with the portable unit is interrupted.

8. The vehicle door control system according to claim 7, wherein:

the vehicle unit is configured to automatically close, after a predetermined time from interruption of the bilateral communications with the portable unit, the vehicle door automatically opened.

9. A door control method for a vehicle having a plurality of doors, a vehicle unit for controlling the doors and a portable unit for bilateral communications with the vehicle unit, the door control method comprising:

storing, in the portable unit, an instruction of an automatic door-opening operation to be performed by the vehicle unit, when predetermined manipulation processing is made to a switch of the portable unit;

transmitting, from the portable unit, a response signal including the stored instruction in response to a request signal transmitted from the vehicle unit, when the portable unit is brought into an area of the bilateral communications;

checking, by the vehicle unit, whether the stored instruction is included in the received response signal, when the response signal is received;

opening, by the vehicle unit, a specified one of the plurality of doors automatically before the portable unit is taken into a vehicle compartment, when the stored instruction is included in the received response signal;

storing, in the vehicle unit, the specified door which is automatically opened;

checking, by the vehicle unit, whether the specified door is stored, when the portable unit is taken out of the vehicle;

opening, by the vehicle unit, the specified door automatically, when the specified door is stored; and closing, by the vehicle unit, the opened specified door automatically again, when the portable unit is taken out of the area of the bilateral communications, wherein the stored instruction of an automatic door-opening operation is cancelled from the portable unit, if a predetermined time from performing the predetermined manipulation processing elapses without the portable unit performing the bilateral communications during the predetermined time.

10. The door control method according to claim 9, wherein:

the closing closes the opened specified door automatically a predetermined time after the specified door has been opened again.

* * * * *